W. B. THURMAN.
STRUCTURAL TOY.
APPLICATION FILED JAN. 22, 1916.
1,241,682.
Patented Oct. 2, 1917.
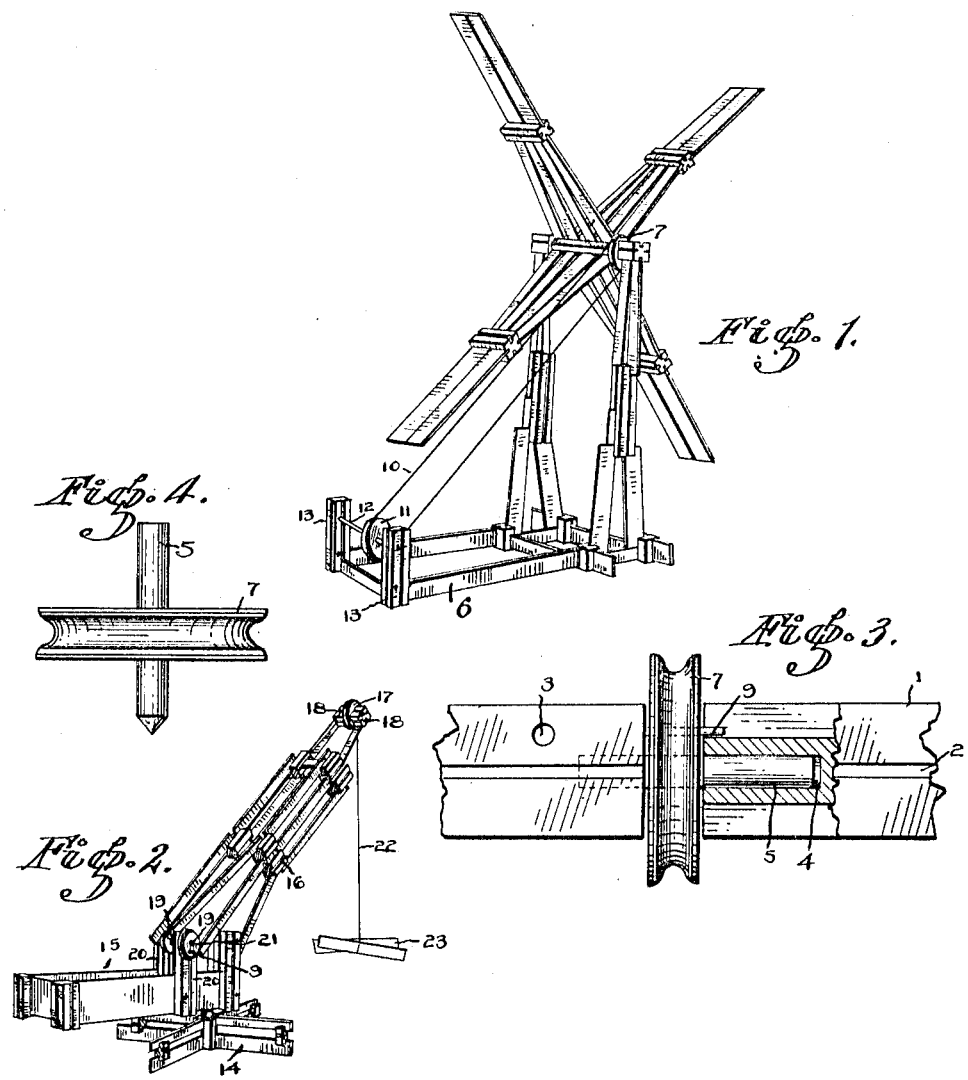
WITNESSES:
INVENTOR.
William B. Thurman
BY
Baldwin Vah ATTORNEYS.

UNITED STATES PATENT OFFICE.

WILLIAM B. THURMAN, OF MADERA, CALIFORNIA.

STRUCTURAL TOY.

1,241,682.   Specification of Letters Patent.   Patented Oct. 2, 1917.

Application filed January 22, 1916. Serial No. 73,723.

*To all whom it may concern:*

Be it known that I, WILLIAM B. THURMAN, a citizen of the United States, residing at the city of Madera, county of Madera, State of California, have invented a new and useful Improvement in Structural Toys, of which the following is a specification.

Attention is directed to my co-pending applications on this same subject, respectively numbered 859,254, filed August 29, 1914, and 62,933, filed November 22, 1915.

Among the objects of this invention are to produce a set of units of such form that they may be joined together for the construction of representations of familiar objects, and with a particular object of constructing certain of the units movable so that mechanical motion may be imparted to such parts of the structure.

In this specification and the annexed drawings, I illustrate the invention in the form that I consider the best, but it is to be understood that I do not limit myself to such form, because the said invention may be embodied in other forms; and it is also to be understood that in and by the claims following the description I desire to cover the invention in whatever form it may be embodied.

The several parts making up a set of units in accordance with this invention have a characteristic means for connecting each with the other—these characteristic means are common to each unit of a given type—whereby any two units or a multiplicity of units may be joined together to form a representation of the design in the mind of the constructor.

The units are of two general types, a joining block or post having grooves in its sides, and a hole in its end and flat construction strips of varying widths and shapes, of a thickness at the edges to frictionally engage the grooves in the block, and dowels to fit said holes, and wheels or rollers to fit said dowels for the objects previously set forth.

In the one sheet of drawings:

Figure 1 is a representation of a Dutch windmill, geared to a counter-shaft.

Fig. 2 is a similar representation of a swinging crane.

Fig. 3 is a fragmentary enlarged detail illustrating the combination of the roller, dowel and block.

Fig. 4 is a side elevation of a top composed of one of the wheels and a sharpened dowel.

In detail the construction illustrated in the drawings includes a polygonal or cylindrical joining block 1, having any number of lateral planes or sides, or the block may be otherwise shaped. The grooves 2 are cut into these blocks, preferably open in the plane thereof; it is obvious however that these grooves may open in the angle of the block, and may be sunken into the block at any desired angle or tangent. Some of the blocks in a set are also provided with the lateral holes 3 in the sides and the holes 4 in the ends, to receive the dowels 5.

The construction units to engage the joining blocks include the flat strips 6 of various widths and lengths, and of a thickness at the edges equal to the width of the groove, which they engage with sufficient friction to securely join the two units for the purpose intended. The wheels 7 are bored in the center to receive the dowel and have the groove 8 in their periphery to receive cords or belts for the purpose of revolving the wheels to impart motion to the desired portion of the objects constructed of these units.

The adaptation of the invention is a question of the ingenuity of the operator. The units can be made to form objects in infinite variety, conventional or fantastic.

This invention will go largely into the hands of small children, for which reason unpainted wood is the preferred material, as it contains no element internally or externally dangerous to an infant.

The slot and groove form of joining is preferred as it is an integral part of the unit and can not be removed and lost, or separated from the unit; for which reason it is preferred to any form of extraneous joining means.

The supporting frame and the wheel of the mill, illustrated in Fig. 1, is constructed in an obvious manner. The details of the mounting of the wheel in the frame are best illustrated in Fig. 3, in which the wheel 7 is forced onto the dowel 5 about midway in length, the projecting ends of the dowel are then inserted in the end holes in the trunnion block and the hub of the wheel. To cause the wheel 7 to revolve with the hub block, a small pin 9 is inserted in a hole provided in the side of the wheel 7. The protruding portion of the pin 9 engages the slot in the hub of the wheel, so that the revolution of the mill wheel will revolve the wheel 7.

The rotation of the wheel 7 is transmitted through the belt 10 to the wheel 11 mounted on the dowel 12 journaled in the holes through the corner blocks 13—13 in the base of the mill.

The swinging crane structure illustrated in Fig. 2 includes the base 14 having a center block with a dowel in the end thereof engaging a similar center block on the swinging frame 15 upon which the crane 16 is mounted. The outer end of the crane is provided with the sheave 17 consisting of the roller fixed on a dowel that is journaled in the corner block 18—18. The windlass is represented by a wheel 19 fixed on a dowel journaled in the upright joining block 20—20, the protruding end of the dowel being provided with the wheel 21 having the pin 9 protruding from the face thereof to act as a handle for revolving the windlass. From the windlass the cord 22 extends over the sheave 17 and supports the load 23, that may be raised or lowered by revolving the windlass.

This disclosure represents but a few of the simpler forms in the application of this invention, but I do not wish to be understood as confining this invention thereto, as many forms and applications are possible within the spirit of this invention.

Having thus described this invention, I claim:

1. A structural toy comprising a longitudinally grooved right angled block having transverse holes therethrough parallel to one of its faces.

2. A structural toy comprising an oblong block in the form of a parallelepiped, said block having longitudinal grooves therein and having also transverse holes therethrough parallel to one of its faces.

3. A structural toy comprising in combination two longitudinally grooved blocks having end apertures, a dowel loose in said apertures, a wheel on said dowel having a central aperture for receiving the dowel and having also an eccentric aperture and a pin in said eccentric aperture engaging a slot in one of said blocks.

In testimony whereof, I have hereunto set my hand, this 10th day of January 1916.

WILLIAM B. THURMAN.

In presence of—
 BALDWIN VALE,
 A. J. HENRY.

Copies of this patent may be obtained for five cents each, by addressing the "Commissioner of Patents, Washington, D. C."